Patented Nov. 4, 1930

1,780,883

UNITED STATES PATENT OFFICE

ANGELO KNORR, OF BERLIN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

SOLUTION OF CELLULOSE DERIVATIVES

No Drawing. Application filed March 16, 1928, Serial No. 262,329, and in Germany December 23, 1924.

According to the application Serial No. 77,133, filed on December 22nd, 1925, of which the present application is a continuation in part, 1.4-dioxane is an excellent solvent for all kinds of organic and inorganic substances which are known to be soluble in the usual organic solvents.

Now it may be stated that dioxane is exceedingly suitable as solvent in the manufacture of cellulose lacquers. It possesses not only excellent solvent properties for nitrocellulose, water-insoluble cellulose ethers and such acetyl celluloses as are soluble in acetone, but it is capable of dissolving all the compounds usually employed in the manufacture of cellulose lacquers. For instance it is a good solvent for natural and artificial resins, for many dyestuffs and for the compounds known in the manufacture of cellulose lacquers as gelatinizing and softening agents.

The solutions of the cellulose derivatives in dioxane can be diluted with hydrocarbons, for instance with hydrocarbons of the benzene series, with aliphatic alcohols, especially with ethyl alcohol, glycol-ethers, ketones and other diluents without the solutions being upset. When dissolving such nitrocelluloses as possess a high viscosity in the solved state, it is advantageous to add to the dioxane a small amount of an aliphatic alcohol.

The following examples serve to illustrate the invention without limiting it, the parts being by weight:

*Example 1.*—10 parts of collodion cotton are dissolved in a mixture of 110 parts of dioxane, 15 parts of butyl acetate and 55 parts of toluene. When used as a lacquer the solution yields highly brilliant clear coatings.

*Example 2.*—10 parts of a nitrocellulose, solutions of which have a low viscosity, are dissolved in a mixture of 15 parts by volume of dioxane, 15 parts by volume of anhydrous ethanol, 25 parts by volume of benzene, 30 parts by volume of ethylene-glycol-monoethyl ether and 5 parts by volume of butanol. This lacquer yields clear brilliant coatings.

To the solution softening agents, such as tricresylphosphate or dibutylphthalate, and dyestuffs, for example rhodamine B may be added.

*Example 3.*—100 parts of collodion cotton, 100 parts of the resin obtained from cyclohexanone by condensation and 50 parts of a partly oxydized linseed oil, which may contain 1.5-2 per cent. of cobalt linoleate, are dissolved in a mixture of 100 parts of ethanol, 135 parts of dioxane, 200 parts of methylcyclohexanone and 150 parts of xylene. The lacquer gives good smooth coatings.

*Example 4.*—50 parts of ethyl cellulose are dissolved in a mixture of 60 parts of dioxane, 20 parts of benzene and 20 parts of butanol. This lacquer gives difficultly inflammable coatings.

*Example 5.*—5 parts of cellulose acetate laurate and 3 parts of dimethylphthalate are dissolved in 50 parts of a mixture prepared from 10 parts by volume of ethanol, 10 parts by volume of benzene, 25 parts by volume of dioxane and 5 parts by volume of methylglycol-acetate. The lacquer yields clear brilliant coatings which are water-repelling and water-proof.

*Example 6.*—1 part of cellulose dilaurate is dissolved in 10 parts of a mixture prepared from 6 parts by volume of benzene, 1 part by volume of chloroform and 3 parts by volume of dioxane. The lacquer furnishes a clear elastic coating.

What I claim is:

1. A cellulose lacquer comprising a cellulose derivative, the hydrogen atom of at least one hydroxyl group of which is substituted by alkyl or acyl, and dioxane.

2. A cellulose lacquer comprising a cellulose derivative, the hydrogen atom of at least one hydroxyl group of which is substituted by alkyl or acyl, dioxane and a liquid hydrocarbon.

3. A cellulose lacquer comprising a cellulose derivative, the hydrogen atom of at least one hydroxyl group of which is substituted by alkyl or acyl, dioxane and a liquid hydrocarbon of the benzene series.

4. A cellulose lacquer comprising a cellulose derivative, the hydrogen atom of at least one hydroxyl group of which is substituted by alkyl or acyl, dioxane, a liquid hydrocarbon and an aliphatic alcohol.

5. A cellulose lacquer comprising a cellulose derivative, the hydrogen atom of at least one hydroxyl group of which is substituted by alkyl or acyl, dioxane, a softening agent and a liquid hydrocarbon.

6. A cellulose lacquer comprising a cellulose derivative, the hydrogen atom of at least one hydroxyl group of which is substituted by alkyl or acyl, dioxane, a softening agent, a liquid hydrocarbon and an aliphatic alcohol.

7. A cellulose lacquer comprising a cellulose ester and dioxane.

8. A cellulose lacquer comprising a cellulose ester, dioxane and a liquid hydrocarbon.

9. A cellulose lacquer comprising a cellulose ester, dioxane and a liquid hydrocarbon of the benzene series.

10. A cellulose lacquer comprising a cellulose ester, dioxane, a liquid hydrocarbon and an aliphatic alcohol.

11. A cellulose lacquer comprising a cellulose ester, dioxane, a softening agent and a liquid hydrocarbon.

12. A cellulose lacquer comprising a cellulose ester, dioxane, a softening agent, a liquid hydrocarbon and an aliphatic alcohol.

13. As a new composition of matter a solution of nitrocellulose containing dioxane.

14. As a new composition of matter a solution of nitrocellulose containing dioxane and a liquid hydrocarbon.

15. As a new composition of matter a solution of nitrocellulose containing dioxane and a liquid hydrocarbon of the benzene series.

16. As a new composition of matter a solution of nitrocellulose containing dioxane, a liquid hydrocarbon and an aliphatic alcohol.

17. As a new composition of matter a solution of nitrocellulose containing dioxane, a softening agent and a liquid hydrocarbon.

18. As a new composition of matter a solution of nitrocellulose containing dioxane, a softening agent, a liquid hydrocarbon and an aliphatic alcohol.

Dr. ANGELO KNORR.